US012581201B2

(12) United States Patent
Nakamura et al.

(10) Patent No.: US 12,581,201 B2
(45) Date of Patent: Mar. 17, 2026

(54) IMAGING CONTROL APPARATUS AND IMAGING CONTROL PROGRAM FOR ADJUSTING EXPOSURE TIME OF A CAMERA

(71) Applicant: DENSO CORPORATION, Kariya-city (JP)

(72) Inventors: Kenji Nakamura, Kariya-city (JP); Kazuhiko Kobayashi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/427,641

(22) Filed: Jan. 30, 2024

(65) Prior Publication Data

US 2024/0259694 A1     Aug. 1, 2024

(30) Foreign Application Priority Data

Feb. 1, 2023    (JP) ................................. 2023-014033

(51) Int. Cl.
| | |
|---|---|
| *H04N 23/73* | (2023.01) |
| *G06V 10/60* | (2022.01) |
| *G06V 20/58* | (2022.01) |
| *H04N 23/61* | (2023.01) |

(52) U.S. Cl.
CPC ............. *H04N 23/73* (2023.01); *G06V 10/60* (2022.01); *G06V 20/582* (2022.01); *G06V 20/584* (2022.01); *H04N 23/61* (2023.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 8,872,918 | B2 * | 10/2014 | Krokel ................... | H04N 23/73 |
| | | | | 348/148 |
| 2003/0122930 | A1 * | 7/2003 | Schofield .................. | B60R 1/23 |
| | | | | 348/E7.086 |
| 2009/0225189 | A1 * | 9/2009 | Morin .................... | G03B 7/003 |
| | | | | 348/222.1 |
| 2010/0172542 | A1 * | 7/2010 | Stein .................... | G08G 1/0967 |
| | | | | 348/148 |
| 2012/0050074 | A1 * | 3/2012 | Bechtel ................ | G06V 10/147 |
| | | | | 382/104 |
| 2017/0017849 | A1 * | 1/2017 | Kristensen ............. | G06V 20/63 |
| 2019/0124277 | A1 * | 4/2019 | Mabuchi ................ | G03B 17/02 |

(Continued)

FOREIGN PATENT DOCUMENTS

| | | |
|---|---|---|
| JP | 2022154347 A | 10/2022 |

*Primary Examiner* — Cynthia Segura
(74) *Attorney, Agent, or Firm* — Maschoff Brennan

(57)         ABSTRACT

An imaging control apparatus is configured to detect a first object and a second object appearing on an image captured by a camera. The first object is higher in luminance than the second object. When the second object is not detected on the image, the imaging control apparatus works to adjusts an exposure time of the camera to a first exposure time which is used when the first object is detected. Alternatively. When the second object is detected, the imaging control apparatus adjusts the exposure time of the camera to a second exposure time which is longer than the first exposure time. This eliminates a failure in identifying colors on the image and also minimizes a risk of appearance of flicker on the image.

7 Claims, 4 Drawing Sheets

(56)    References Cited

U.S. PATENT DOCUMENTS

| 2021/0092280 A1* | 3/2021 | Nishimura | ............... | G06N 3/04 |
| 2022/0201184 A1* | 6/2022 | Nakamura | ......... | H04N 23/6811 |
| 2023/0332911 A1* | 10/2023 | Nayak | ................ | G01C 21/3602 |
| 2025/0336215 A1* | 10/2025 | Shiga | .................... | H04N 25/44 |

* cited by examiner

START

OBTAIN INFORMATION — S100

OBJECT IS DETECTED ? — S102

NO

YES

IDENTIFY OBJECT — S104

RETURN

START

OBTAIN INFORMATION — S200

SECOND OBJECT ?
AND
ON EXPRESSWAY ? — S202

NO

YES

Te = Te_ES — S206

Te = Te_TL — S204

RETURN

IMAGING CONTROL APPARATUS AND IMAGING CONTROL PROGRAM FOR ADJUSTING EXPOSURE TIME OF A CAMERA

CROSS REFERENCE TO RELATED DOCUMENT

The present application claims the benefit of priority of Japanese Patent Application No. 2023-014033 filed on Feb. 1, 2023, the disclosure of which is incorporated in its entirety herein by reference.

BACKGROUND

1 Technical Field

This disclosure relates generally to an imaging control apparatus and an imaging control program.

2 Background Art

Japanese Patent First Publication No. 2022-154347 teaches an imaging control apparatus including a first setting means, a detecting means, and a second setting means. The first setting means works to derive an intensity of luminance of a first area that is one of sections into which an overall area of an image captured by a camera is divided and set a first exposure condition for use in the camera to capture an image of a region corresponding to the first area as a function of the intensity of luminance of the first area. The detecting means detects a traffic light or a road sign from at least a portion of the image. The second setting means works to set a second exposure condition for use in the camera to capture an image of a region corresponding to a second area that is one of the sections of the image on which the traffic light or the road sign is appearing. The second exposure condition is determined using information about the traffic light or road sign being lit or unlit. The second setting means also adjusts an exposure time of the camera to be longer than a cycle in which the traffic light or the road sign is lit.

Usually, there are many different types of road signs, so that some of them have lighting cycles longer than those of traffic lights. The imaging control apparatus taught in the above publication is, therefore, designed to increase the exposure time of the camera using the second setting means to minimize a risk of appearance of flicker on the image. The traffic lights are, however, usually higher in luminance than the road signs, such as electronic light signs. The increase in exposure time of the camera made by the second setting means, therefore, causes the quantity of light entering the camera to exceed a saturated light quantity of the camera, which may result in a failure in identifying colors on an image captured by the camera. It is, therefore, impossible for the imaging control apparatus taught in the above-described publication to eliminate both a failure in identifying colors on the image and a risk of appearance of flicker on the image.

SUMMARY

It is an object of this disclosure to provide an imaging control apparatus and an imaging control program to minimize a failure in identification of colors and appearance of flicker on an image captured by a camera.

According to one aspect of this disclosure, there is provided an imaging control apparatus which comprises: (a) a detector which is configured to detect a first object and a second object which appear to be lit on an image captured by a camera, the second object being lower in luminance than the first object; and (b) an exposure time adjuster which, when the second object is not detected, adjusts an exposure time of the camera to a first exposure time which is used when the first object is detected or, when the second object is detected, adjusts the exposure time of the camera to a second exposure time which is longer than the first exposure time.

According to the second aspect of this disclosure, there is provided an imaging control program which actuates an imaging control apparatus to function as: (a) a detector which works to detect a second object which appears on an image captured by a camera and is lower in luminance than a first object appearing on the image; and (b) an exposure time adjuster which, when the second object is not detected, adjusts an exposure time of the camera to a first exposure time which is used when the first object is detected or, when the second object is detected, adjusts the exposure time of the camera to a second exposure time which is longer than the first exposure time.

When the second object is not detected, the exposure time of the camera is set shorter than the second exposure time, thereby minimizing a risk that the quantity of light entering the camera may exceed a saturated light quantity of the camera. This alleviates a failure in identifying colors on an image captured by the camera. When the second object which is lower in luminance than the first object is detected on the image, the exposure time of the camera is increased, thereby reducing the appearance of flicker on the image.

According to the third aspect of this disclosure, there is provided an imaging control apparatus which comprise: (a) an information obtainer which obtains information about a position of a vehicle; and (b) an exposure time adjuster which, when the vehicle is on a road other than an expressway, adjusts an exposure time of a camera mounted in the vehicle to a first exposure time used when a first object is detected as being lit on an image captured by the camera. The first exposure time is selected to be shorter than a second exposure time used when a second object which is lower in illuminance than the first object is detected as being lit on the image. When the vehicle is on an expressway, the exposure time adjuster sets the exposure time of the camera to the second exposure time which is longer than the first exposure time.

According to the fourth aspect of this disclosure, there is provided an imaging control program which actuates an imaging control apparatus to function as: (a) an information obtainer which obtains information about a position of a vehicle; and (b) an exposure time adjuster which, when the vehicle is on a road other than an expressway, adjusts an exposure time of a camera mounted in the vehicle to a first exposure time used when a first object is detected as being lit on an image captured by the camera. The first exposure time is selected to be shorter than a second exposure time used when a second object which is lower in illuminance than the first object is detected as being lit on the image. When the vehicle is on an expressway, the exposure time adjuster sets the exposure time of the camera to the second exposure time which is longer than the first exposure time.

Usually, there are a few second objects on an expressway, while there are many first objects on the expressway. The exposure time of the camera is, as described above, increased to be longer than the first exposure time, thereby minimizing a risk of appearance of flicker on the image. In roads other then expressways, there are usually many second objects lower in luminance than the first objects. When the vehicle is determined to be on a road other than the expressway, the imaging control program serves to set the exposure time of the camera to be shorter than the second exposure time, thereby minimizing a risk that the quantity of light entering the camera may exceed a saturated light quantity of the camera. This ensures the stability in identifying colors on the image.

In this disclosure, reference numbers or symbols in brackets represent correspondence relations to elements discussed in embodiments, as described below.

BRIEF DESCRIPTION OF THE DRAWINGS

The present disclosure will be understood more fully from the detailed description given hereinbelow and from the accompanying drawings of the preferred embodiments, which, however, should not be taken to limit the invention to the specific embodiments but are for the purpose of explanation and understanding only.

In the Drawings.

DESCRIPTION OF THE PREFERRED EMBODIMENT

An embodiment will be described below with reference to the drawings. For facilitating the understanding of this disclosure, the same or similar reference numbers or symbols throughout the drawings refer to the same or similar parts, and a repeated explanation will be omitted here.

Figure 1:
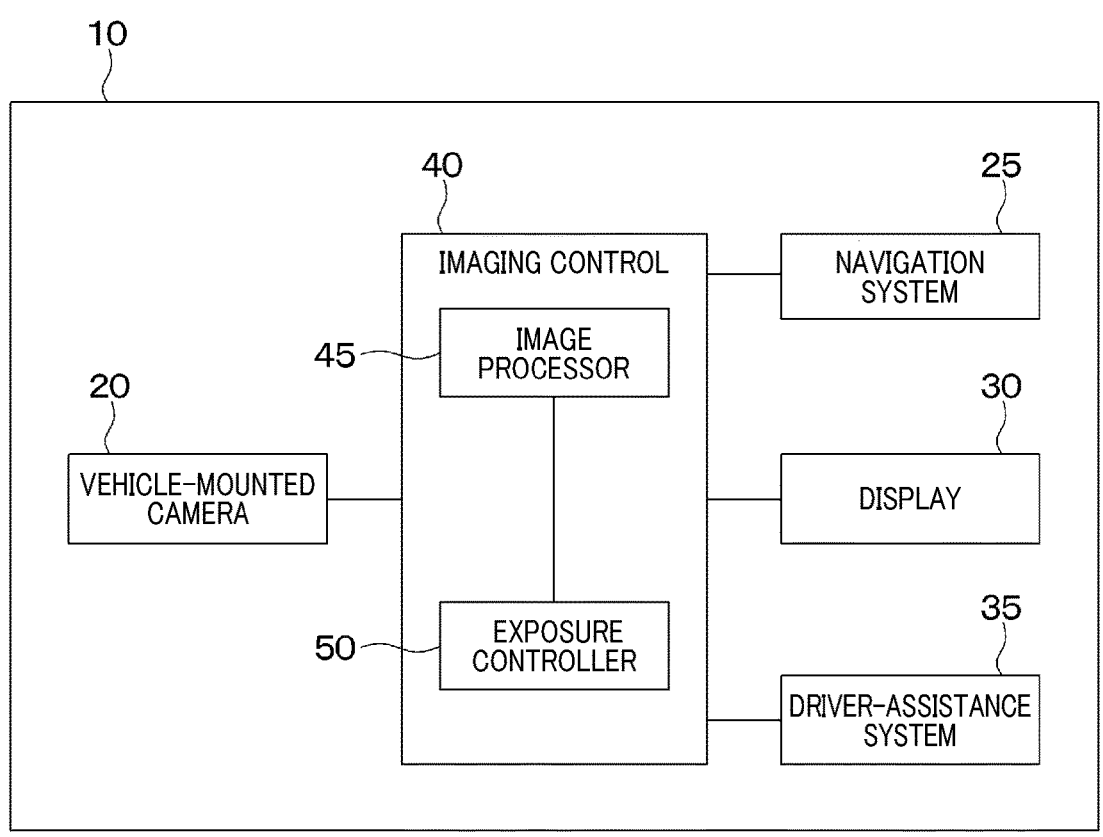
FIG. 1 is a block diagram which illustrates a vehicle system using an imaging control apparatus according to an embodiment.

The imaging control apparatus in this embodiment is configured to minimize a failure in identification of colors and/or flicker on an image captured by a vehicle-mounted camera. Specifically, the imaging control apparatus in this embodiment is used with the vehicle system 10 illustrated in FIG. 1. The vehicle system 10 will first be described.

The vehicle system 10 includes the vehicle-mounted camera 20, the navigation system 25, the display 30, the driver-assistance system 35, and the imaging control apparatus 40.

Figure 2:
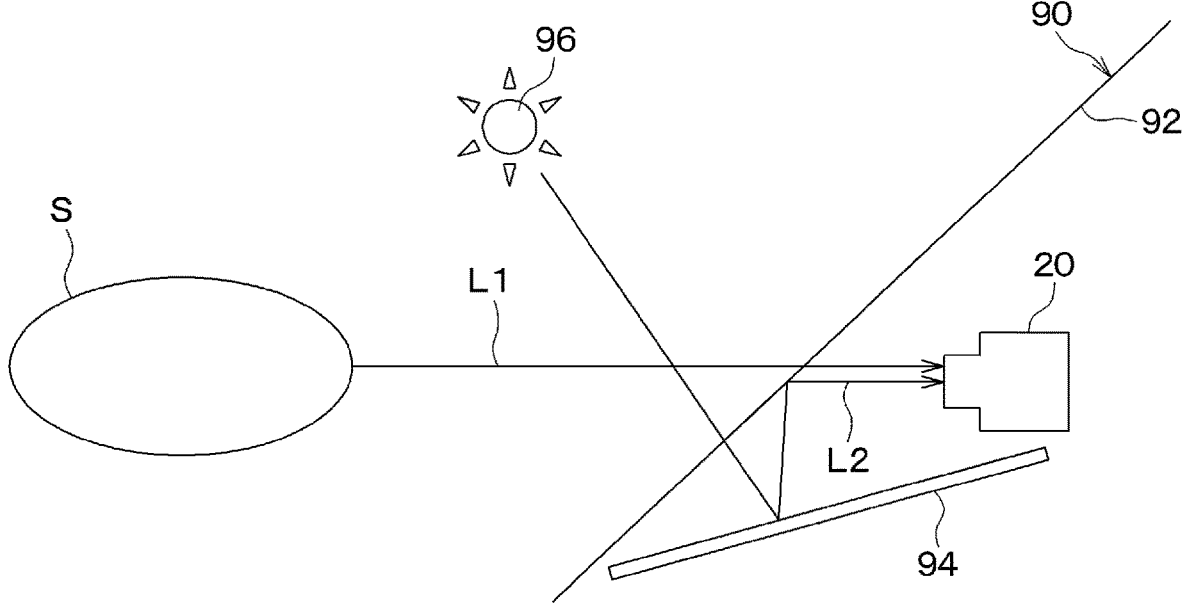
FIG. 2 is a schematic view which shows layout of a vehicle-mounted camera.

The vehicle-mounted camera 20 includes an imaging device such as a CMOS (Complementary Metal Oxide Semiconductor) image sensor. The vehicle-mounted camera 20 is, as illustrated in FIG. 2, arranged in the vicinity of the front windshield 92 of the vehicle 90. The vehicle-mounted camera 20 works to capture an image of a predetermined region in front of the vehicle 90. The vehicle-mounted camera 20 is controlled to capture an image at a predetermined time interval, e.g., in a cycle of 60 seconds. Referring back to FIG. 1, the vehicle-mounted camera 20 outputs the captured image in the form of an electrical signal to the imaging control apparatus 40 which will be described later in detail. The location of the vehicle-mounted camera 20 in or on the vehicle 90 is optional. The region whose image is captured by the vehicle-mounted camera 20 or the imaging cycle is also optionally determined. The hood 94 is, as illustrated in FIG. 2, disposed beneath the vehicle-mounted camera 20. The hood 94 is made of, for example, a black antireflection plate or a plastic plate and serves as a shield to block entry of light into the vehicle-mounted camera 20 from below it within the vehicle 90. Usually, it is impossible for the hood 94 to have a reflectance of zero. Light from the sun 96 will, thus, be reflected on the hood 94, thus causing light L1 from the object S and light L2 reflected on the hood 94 to enter the vehicle-mounted camera 20.Ii Referring back to FIG. 1, the navigation system 25 is equipped with a GNSS (Global Navigation Satellite System) receiver. The navigation system 25 receives signals from a plurality of satellites, not shown. The navigation system 25 analyzes the received signals to derive information about a geodetic position of the vehicle 90. The navigation system 25 outputs a signal produced based on such positional information about the vehicle 90 to the imaging control apparatus 40 which will be described later in detail. The satellites used in the navigation system 25 include, for example, GPS satellites, GLONASS satellites, Galileo satellites, or quasi-zenith satellites.

The display 30 represents an image captured by the vehicle-mounted camera 20 in visual. The display 30 is arranged in a field-of-view range of an operator of the vehicle 90, e.g., in the vicinity of the windshield 92.

The driver-assistance system 35 is made mainly of a microcomputer including a CPU, a ROM, a flash memory, a RAM, an I/O device, driver circuits, and bus lines connecting them together. The driver-assistance system 35 works to execute programs stored in the ROM of the driver-assistance system 35, so that the driver-assistance system 35 analyzes an image which is captured by the vehicle-mounted camera 20 and then processed by the imaging control apparatus 40, which will be described later in detail, to perform an alarm output task or a driving control task in the vehicle 90. The alarm output task is to output an alarm when the vehicle 90 is undesirably going to depart from a traffic lane. The driving control task is to control a steering operation or a braking operation of the vehicle 90 to keep the vehicle 90 moving within the traffic lane.

The imaging control apparatus 40 is made mainly of a microcomputer which includes a CPU, a ROM, a flash memory, a RAM, and I/O device, driver circuits, and bus lines connecting them. The imaging control apparatus 40 performs an image processing operation on an image captured by the vehicle-mounted camera 20 and also controls the exposure time Te of the vehicle-mounted camera 20. Specifically, the imaging control apparatus 40 includes the image processor 45 and the exposure controller 50 in the form of functional blocks or logical circuits.

The image processor 45 executes program stored in the ROM of the image processor 45 to use the image captured by the vehicle-mounted camera 20 to calculate a position of an image appearing on an object relative to the vehicle 90. The image processor 45 outputs the image taken by the vehicle-mounted camera 20 and a signal representing the calculated relative position of the object to the driver-assistance system 35. The driver-assistance system 35 uses the relative position of the object to perform the alarm output task, the driving control task, and/or a driver-assistance task in the vehicle 90.

Figure 3:
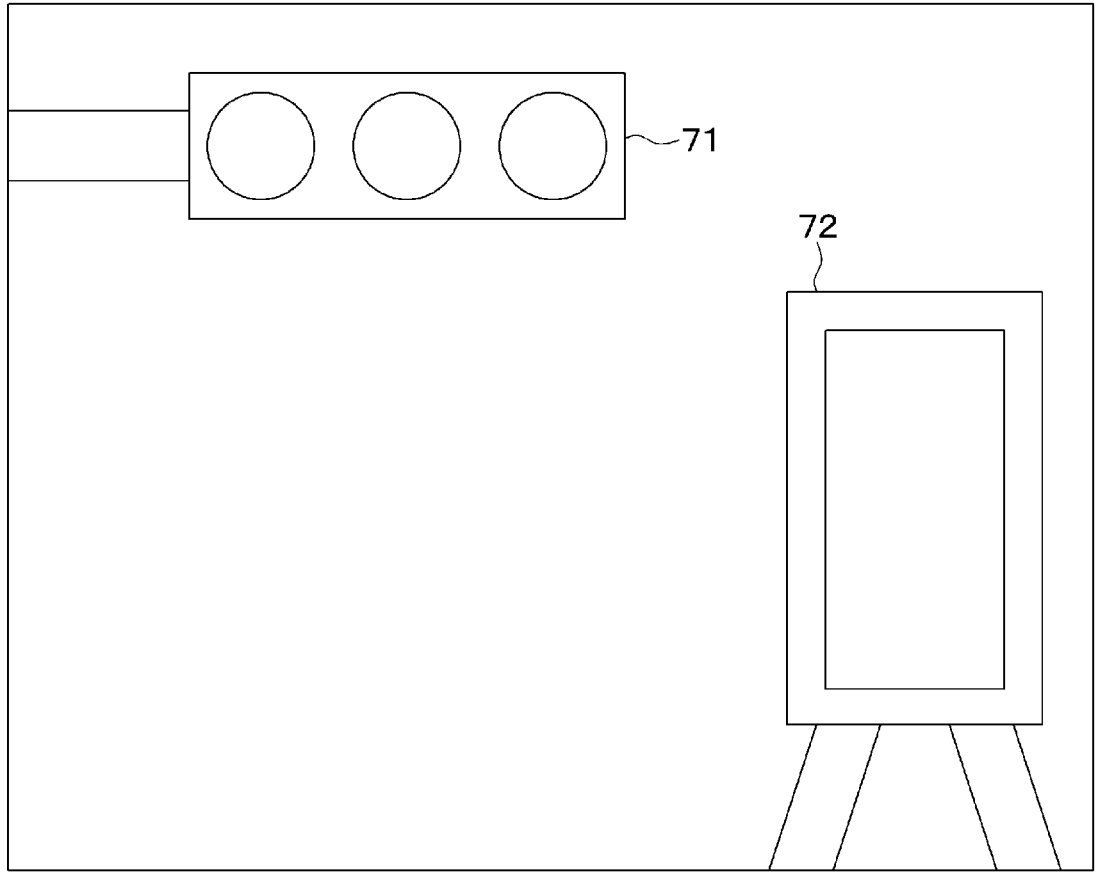
FIG. 3 is a schematic view which demonstrates a first object and a second object appearing on an image captured by a camera.

The image processor 45 works to execute programs stored in the ROM of the image processor 45 to detect a bright object appearing on the image taken by the vehicle-mounted camera 20. The image processor 45 uses image recognition techniques, teaching data, and/or mechanical learning techniques to determine whether the object derived from the image taken by the vehicle-mounted camera 20 is identified to be the first object 71 or the second object 72. The image processor 45 output the image taken by the vehicle-mounted camera 20 and information about the type of the object to the exposure controller 50 which will be described later in detail. The first object 71 is, for example, a traffic light shown in FIG. 3. The second object 72 is, for example, an electronic road sign which is lower in brightness or luminance than the first object 71. An on-off cycle or period of time in which the second object 72 is illuminated or lit or unlit longer than that in which the first object 71 is kept lit. Such a lighting cycle, as referred to herein, is a period of time in which an object starts to be lit, is darkened or turned off, and then starts to be lit again. The electronic road sign, as referred to herein, is a traffic mark or sign which is lit or unlit.

The exposure controller 50 executes programs retained in the ROM of the exposure controller 50 to analyze a result of object identification performed by the image processor 45 and the positional information about the vehicle 90 derived from the navigation system 25 to control the exposure time Te of the vehicle-mounted camera 20.

Figure 4:
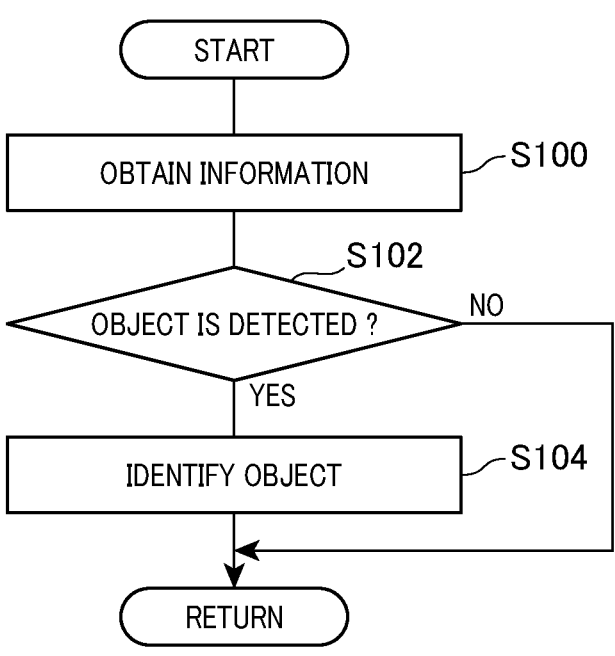
FIG. 4 is a flowchart of an image processing program executed by an imaging control apparatus in an embodiment.

The vehicle system 10 is designed to have the above-described structure. For instance, when an ignition is turned on in the vehicle 90, the imaging control apparatus 40 of the vehicle system 10 starts to execute the programs in the image processor 45 and the exposure controller 50. A sequence of steps of the program executed in the image processor 45 will be described below with reference to a flowchart of FIG. 4.

After entering the program, the routine proceeds to step S100 wherein the image processor 45 obtains information. Specifically, the image processor 45 derives from the vehicle-mounted camera 20 an image captured by the vehicle-mounted camera 20.

The routine then proceeds to step S102 wherein the image processor 45 uses image recognition techniques, teaching data, and/or mechanical learning techniques to determine whether a bright or lit object is appearing on the image derived in step S100. In other words, the image processor 45 works to detect a lit object(s) present in front of the vehicle 90.

If a YES answer is obtained in step S102 meaning that an object is appearing to be lit on the captured image, that is, the image processor 45 has detected a lit object present in front of the vehicle 90, the routine proceeds to step S104 to perform an object identification task, as will be described later in detail. Alternatively, if a NO answer is obtained meaning that there is no lit object appearing on the captured image, that is, no lit object is present in front of the vehicle 90, the routine returns back to step S100.

If a YES answer is obtained in step S102, then the routine proceeds to step S104 wherein the image processor 45 identifies which of the first object 71 or the second object 72 is appearing as the lit object detected in step S102.

The intensity of luminance of the second object 72 is, as described above, lower than that of the first object 71. The image processor 45, thus, determines whether the luminance of the object detected in step S102 is lower than or equal to a given luminance threshold value to identify whether the detected object is the first object 71 or the second object 72. The luminance threshold value is predetermined to be a level required for identification of the lit object using experiments or simulations.

When determining that the luminance of the detected object is lower than or equal to the luminance threshold value, the image processor 45 identifies the detected object as the second object 72. Alternatively, when determining that the luminance of the detected object is higher than the luminance threshold value, the image processor 45 identifies the detected object as the first object 71. The image processor 45 outputs a signal indicating the result of identification to the exposure controller 50. After step S104, the routine returns back to step S100. The above-described object identification may alternatively be achieved in another way. The first object 71 is, as described above, a traffic light, while the second object 72 is an electronic road sign. The above-described object identification may, therefore, be made by the image processor 45 using known image recognition techniques, teaching data, or mechanical learning techniques.

Figure 5:
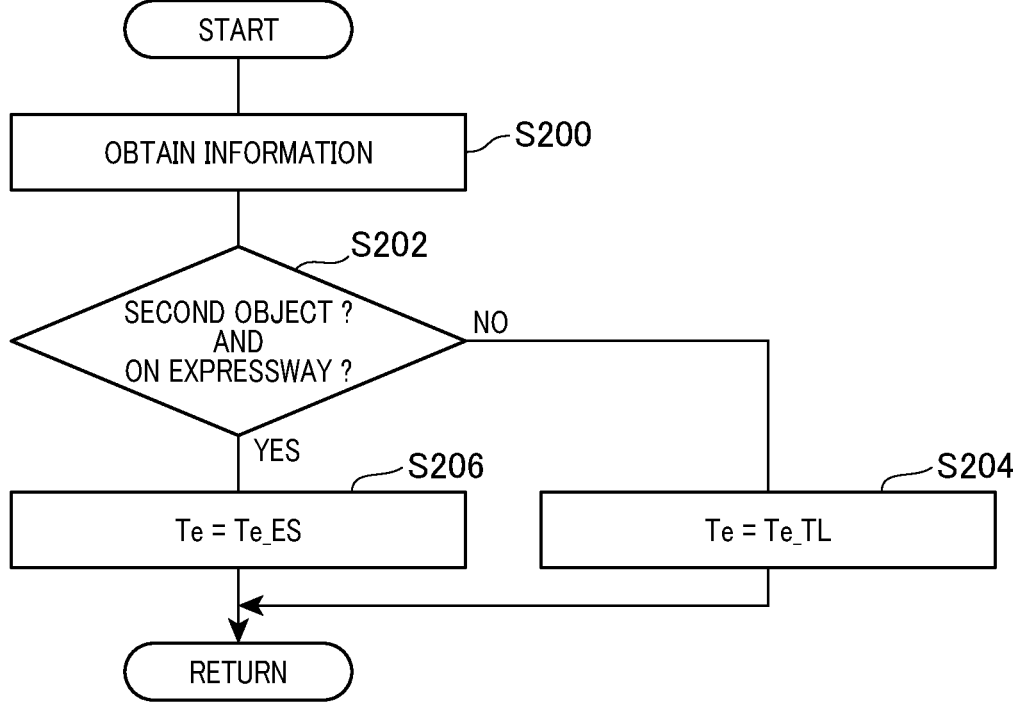
FIG. 5 is a flowchart of an exposure time control program executed by an imaging control apparatus in an embodiment.

The image processor 45 executes the above-described logical steps. The operation of the exposure controller 50 implemented by a program will be described below with reference to a flowchart in FIG. 5.

After entering the program, the routine proceeds to step S200 wherein the exposure controller 50 obtains information. Specifically, the exposure controller 50 receives a signal from the image processor 45 which indicates the result of identification made by the image processor 45. The exposure controller 50 also derives the positional information about the vehicle 90 from the navigation system 25. The exposure controller 50 may alternatively be designed to receive an image captured by the vehicle-mounted camera 20 directly from the vehicle-mounted camera 20 and analyze the received image using image recognition techniques, teaching data, or mechanical learning techniques, to identify a tollgate or a road structure appearing on the image, thereby deriving the positional information about the vehicle 90 to determine that the vehicle 90 is now on an expressway, which will be described later in detail.

The routine proceeds to step S202 wherein the exposure controller 50 uses the result of identification derived in step S200 to determine whether an object appearing on an image captured by the vehicle-mounted camera 20 is the second object 72 or not. The exposure controller 50 also determines whether the position of the vehicle 90 obtained in step S200 represents that the vehicle 90 is on an expressway. The expressway, as referred to herein, is one of highways which interconnect major regions, such as big cities, industrial towns, major harbors, or airports essential for politics, economics, or cultures and are legally or structurally defined to ensure the safety and comfortable driving of vehicles. In Japan, the expressway is a national expressway or limited highway.

If it is determined that the object appearing on the image captured by the vehicle-mounted camera 20 is not the second object 72 and that the vehicle 90 is not on the expressway, then the routine proceeds to step S204. Alternatively, if it is determined that the object appearing on the image captured by the vehicle-mounted camera 20 is the second object 72 and the vehicle 90 is not on the expressway, then the routine proceeds to step S206. Alternatively, if it is determined that the object appearing on the image captured by the vehicle-mounted camera 20 is not the second object 72 and the vehicle 90 is now on the expressway, then the routine proceeds to step S206. Alternatively, if it is determined that the object appearing on the image captured by the vehicle-mounted camera 20 is the second object 72 and the vehicle 90 is now on the expressway, then the routine proceeds to step S206. If having detected no object appearing on the image captured by the vehicle-mounted camera 20, the exposure controller 50 views such a fact as being equivalent to the determination that the object on the image is not the second object 72. When both the first object 71 and the second object 72 are appearing to be lit on the image captured by the vehicle-mounted camera 20, the exposure controller 50 views such a fact as being equivalent to the determination that the object on the image is the second object 72 without determining the object on the image as the first object 71.

The luminance of the first object 71 (i.e., traffic light) is, as described above, higher than that of the second object 72 (i.e., electronic road sign). An increase in exposure time Te of the vehicle-mounted camera 20, therefore, may cause the quantity of light entering the vehicle-mounted camera 20 to be higher than a saturated light quantity of the vehicle-mounted camera 20, which results in a failure in identifying colors on an image captured by the vehicle-mounted camera 20.

Generally, on the expressway, there are few first objects 71, such as traffic lights, while there are many second objects, such as electronic road signs. In regions other than expressways, e.g., on ordinary roads, there are many first objects 71, such as traffic lights, while there are few second objects 72, such as electronic road signs.

When it is determined in step S202 that an object on the image captured by the vehicle-mounted camera 20 is not the second object 72 and the vehicle 90 is not on the expressway, in other words, when an object appearing to be lit on the image captured by the vehicle-mounted camera 20 is the first object or when a road on which the vehicle 90 exists is an ordinary road where there are usually many traffic lights (i.e., the first objects 71), the routine proceeds from step S202 to step S204.

Accordingly, in step S204, the exposure controller 50 outputs a control signal to the vehicle-mounted camera 20 to set the exposure time Te of the vehicle-mounted camera 20 to the first exposure time Te_TL suitable for imaging the first object 71. Afterwards, the routine returns back to step S200. The first exposure time Te_TL is predetermined using, for example, experiments or simulations to eliminate a risk that it may be impossible to identify colors on an image captured by the vehicle-mounted camera 20 and a flicker may appear on the image.

The second object 72, such as an electronic road sign, is, as described already, lower in luminance than the first object 71, such as a traffic light. An increase in exposure time Te of the vehicle-mounted camera 20 will, therefore, result in no risk that the quantity of light entering the vehicle-mounted camera 20 may be higher than the saturated light quantity. Usually, there are also many types of the second object 72, such as electronic road signs. The on-off cycle in which the second object 72 is lit and then unlit is normally longer than that in which the first object 71 is lit and then unlit. This may result in generation of a flicker on an image captured by the vehicle-mounted camera 20. There are, as described above, many first objects 71 on the expressway, while there are few second objects on the expressway.

When it is determined in step S202 that an object on the image captured by the vehicle-mounted camera 20 is the second object 72 or when the vehicle 90 is in a region where there are many second objects (i.e., electronic road signs), the routine proceeds from step S202 to step S206.

Accordingly, in step S206, the exposure controller 50 outputs a control signal to the vehicle-mounted camera 20 to set the exposure time Te of the vehicle-mounted camera 20 to the second exposure time Te_ES which is longer than the first exposure time Te_TL. The second exposure time Te_ES is longer than the first exposure time Te_TL, thereby reducing a risk of appearance of flicker on the image. The second exposure time Te_ES is selected to be suitable for imaging the second object 72, such as an electronic road sign. The second exposure time Te_ES is predetermined using, for example, experiments or simulations to ensure stability in identifying colors on an image captured by the vehicle-mounted camera 20 and minimize a risk that a flicker may appear on the image.

The exposure controller 50 operates in the above way. The imaging control apparatus 40 is configured to ensure stability in identifying colors on an image captured by the vehicle-mounted camera 20 and reduce the risk of generation of a flicker on the image in the following way.

The image processor 45 of the imaging control apparatus 40 serves as a detector in step S104 to detect the second object 72 which is lit at a luminance lower than that of the first object 71. The exposure controller 50 of the imaging control apparatus 40 works as an exposure time adjuster to adjust the exposure time Te of the vehicle-mounted camera 20 to the first exposure time Te_TL when there is no second object 72 on the image. When detecting the second object 72, the exposure controller 50 also adjusts the exposure time Te to the second exposure time Te_ES that is longer than the first exposure time Te_TL. The first exposure time Te_TL represents the exposure time Te of the vehicle-mounted camera 20 when the first object 71 is being detected on the image captured by the vehicle-mounted camera 20. Similarly, the second exposure time Te_ES represents the exposure time Te of the vehicle-mounted camera 20 when the second object 72 is being detected on the image captured by the vehicle-mounted camera 20.

When the first object 71 which is higher in luminance than the second object 72 is detected on the image, the exposure time Te of the vehicle-mounted camera 20 is, as described above, set to be shorter than the second exposure time Te_ES, thereby minimizing a risk that the quantity of light incident to the vehicle-mounted camera 20 may be higher than or equal to the saturated light quantity of the vehicle-mounted camera 20. This reduces a failure in identifying colors on the image captured by the vehicle-mounted camera 20. When the second object 72 which is lower in luminance than the first object 71 is detected on the image, the exposure time Te of the vehicle-mounted camera 20 is, as described above, set to be longer than the first exposure time Te_TL, thereby minimizing a risk of appearance of flicker on the image. This eliminates a failure in identifying colors on an image captured by the vehicle-mounted camera 20 and reduces the generation of a flicker on the image.

The imaging control apparatus 40 also offers additional beneficial advantages discussed below.

1) The exposure controller 50 works as an information obtainer to derive information about the position of the vehicle 90. When the derived information indicates that the vehicle 90 is on a road other than an expressway, the exposure controller 50 serves as an exposure time adjuster to set the exposure time Te of the vehicle-mounted camera 20 to the first exposure time Te_TL. When the derived information indicates that the vehicle 90 is on the expressway, the exposure controller 50 sets the exposure time Te to the second exposure time Te_ES that is longer than the first exposure time Te_TL.

On the expressway, as described above, there are few first objects 71, such as traffic lights, while there are many second objects, such as electronic road signs. When it is, therefore, determined that the vehicle 90 is on the expressway, the exposure time Te of the vehicle-mounted camera 20 is set to be longer than the first exposure time Te_TL, thereby reducing the appearance of flicker on the image. In regions other than expressways, e.g., on ordinary roads, there are many first objects 71, such as traffic lights, while there are few second objects 72, such as electronic road signs. The exposure time Te of the vehicle-mounted camera 20 is, therefore, set to be shorter than the second exposure time Te_ES, so that there is a low possibility that the quantity of light entering the vehicle-mounted camera 20 will be greater than the saturated light quantity. This reduces a failure in identifying colors on the image captured by the vehicle-mounted camera 20, thereby ensuring the stability in identifying colors on the image and minimizing a risk of appearance of flicker on the image.

2) When the first object 71 and the second object 72 are determined to be appearing on an image captured by the vehicle-mounted camera 20, the exposure controller 50, as described above, adjusts the exposure time Te to the first exposure time Te_TL.

In other words, when the first object 71 which has a higher luminance and the second object 72 which has a lower luminance are both detected on the image, the exposure time Te is set to be shorter than the second exposure time Te_ES, thereby eliminating a risk that the quantity of light which is produced by the first object 71 and enters the vehicle-mounted camera 20 may be higher than the saturated light quantity. This minimizes a failure in identifying colors on an image captured by the vehicle-mounted camera 20.

Modifications

Figure 6:
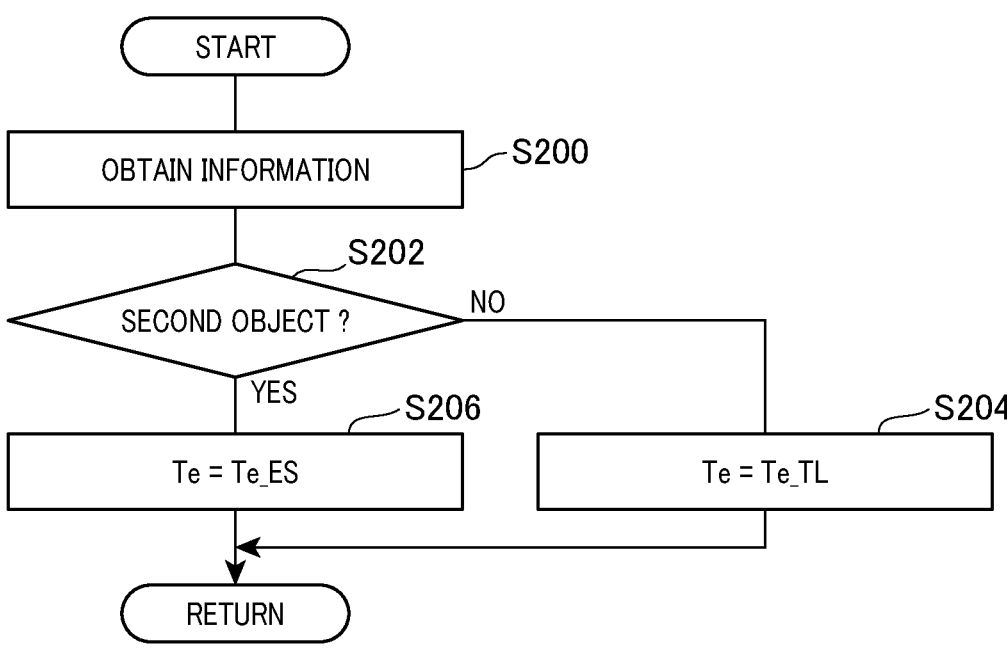
FIG. 6 is a flowchart of a modification of the exposure time control program in FIG. 5.
Figure 7:
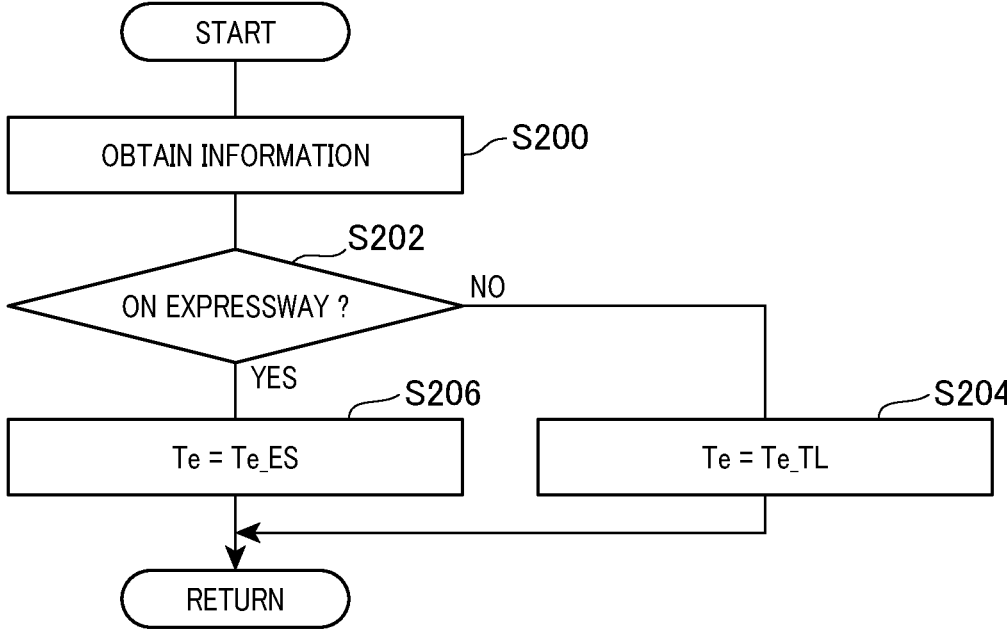
FIG. 7 is a flowchart of another modification of the exposure time control program in FIG. 5.

The exposure controller 50, as described above, determines in step S202 whether an object appearing on an image captured by the vehicle-mounted camera 20 is the second object 72 or whether the vehicle 90 is now on the expressway, but however, it may alternatively only determine in step S202 illustrated in a flowchart of FIG. 6 whether the object on the image captured by the vehicle-mounted camera 20 is the second object 72. The exposure controller 50 may alternatively only determine in step S202 in FIG. 7 whether the vehicle 90 is now on the expressway.

Other Embodiments

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

The operation of each of the information obtainer, the detector and the exposure time adjuster referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The information obtainer, the detector or the exposure time adjuster and operations thereof may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the information obtainer, the detector or the exposure time adjuster need not necessarily include software, but may be realized by one or a plurality of hardware devices.

In the above embodiment, the exposure controller 50 uses the result of identification made by the image processor 45 to control the exposure time Te of the vehicle-mounted camera 20, but however, it may alternatively be designed to use a result of identification of an object on a captured image which is achieved by an external device disposed outside the imaging control apparatus 40.

As apparent from the above discussion of the embodiments or modifications thereof, this disclosure provides the following aspects.

First Aspect

An imaging control apparatus is provided which comprises: (a) a detector (S104) which is configured to detect a first object (71) and a second object (72) which appear to be lit on an image captured by a camera (20), the second object being lower in luminance than the first object; and (b) an exposure time adjuster (S202, S204, S206) which, when the second object is not detected, adjusts an exposure time (Te) of the camera to a first exposure time (Te_TL) which is used when the first object is detected or, when the second object is detected, adjusts the exposure time of the camera to a second exposure time (Te_ES) which is longer than the first exposure time.

Second Aspect

In the imaging control apparatus in the first aspect, the first object is a traffic light, and the second object is an electronic road sign.

Third Aspect

In the imaging control apparatus in the first or second aspect, a cycle in which the second object is lit is longer than that in which the first object is lit.

Fourth Aspect

In the imaging control apparatus in any one of the first to the third aspect, when the first object and the second object are both appearing on the image, the exposure time adjuster serves to set the exposure time to the first exposure time.

Fifth Aspect

An imaging control apparatus is provided which comprise: (a) an information obtainer (S200) which obtains information about a position of a vehicle (90); and (b) an exposure time adjuster which, when the vehicle is on a road other than an expressway, adjusts an exposure time (Te) of a camera (20) mounted in the vehicle to a first exposure time (Te_TL) used when a first object (71) is detected as being lit on an image captured by the camera. The first exposure time is selected to be shorter than a second exposure time (Te_ES) used when a second object (72) which is lower in illuminance than the first object is detected as being lit on the image. When the vehicle is on an expressway, the exposure time adjuster sets the exposure time of the camera to the second exposure time which is longer than the first exposure time.

Sixth Aspect

An imaging control program is provided which actuates an imaging control apparatus to function as: (a) a detector (S104) which works to detect a second object (72) which appears on an image captured by a camera (20) and is lower in luminance than a first object appearing on the image; and (b) an exposure time adjuster (S202, S204, S206) which, when the second object is not detected, adjusts an exposure time (Te) of the camera to a first exposure time (Te_TL) which is used when the first object is detected or, when the second object is detected, adjusts the exposure time of the camera to a second exposure time (Te_ES) which is longer than the first exposure time.

Seventh Aspect

An imaging control program is provided which actuates an imaging control apparatus to function as: (a) an information obtainer (S200) which obtains information about a position of a vehicle (90); and (b) an exposure time adjuster which, when the vehicle is on a road other than an expressway, adjusts an exposure time (Te) of a camera (20) mounted in the vehicle to a first exposure time (Te_TL) used when a first object (71) is detected as being lit on an image captured by the camera. The first exposure time is selected to be shorter than a second exposure time (Te_ES) used when a second object (72) which is lower in illuminance than the first object is detected as being lit on the image. When the vehicle is on an expressway, the exposure time adjuster sets the exposure time of the camera to the second exposure time which is longer than the first exposure time.

What is claimed is:

1. An imaging control apparatus for a vehicle, the imaging control apparatus comprising:
 a detector which is configured to detect a first object and a second object which appear to be lit on an image captured by a camera, the second object being lower in luminance than the first object; and
 an exposure time adjuster which, when the second object is not detected, adjusts an exposure time of the camera to a first exposure time which is used when the first object is detected and, when the second object is detected and when determining that the vehicle is on an expressway, adjusts the exposure time of the camera to a second exposure time which is longer than the first exposure time.

2. The imaging control apparatus as set forth in claim 1, wherein the first object is a traffic light, and the second object is an electronic road sign.

3. The imaging control apparatus as set forth in claim 1, wherein a cycle in which the second object is lit is longer than that in which the first object is lit.

4. The imaging control apparatus as set forth in claim 1, wherein when the first object and the second object are both appearing on the image, the exposure time adjuster serves to set the exposure time to the first exposure time.

5. An imaging control apparatus comprising:
 an information obtainer which obtains information about a position of a vehicle; and
 an exposure time adjuster which, when the information indicates that the vehicle is on a road other than an expressway, adjusts an exposure time of a camera mounted in the vehicle to a first exposure time used when a first object is detected as being lit on an image captured by the camera, the first exposure time being selected to be shorter than a second exposure time used when a second object which is lower in illuminance than the first object is detected as being lit on the image, when the vehicle is on an expressway, the exposure time adjuster sets the exposure time of the camera to the second exposure time which is longer than the first exposure time.

6. A non-transitory computer-readable medium storing an imaging control program which actuates an imaging control apparatus for a vehicle to function as:
 a detector which works to detect a second object which appears on an image captured by a camera and is lower in luminance than a first object appearing on the image; and
 an exposure time adjuster which, when the second object is not detected, adjusts an exposure time of the camera to a first exposure time which is used when the first object is detected and, when the second object is detected and when determining that the vehicle is on an expressway, adjusts the exposure time of the camera to a second exposure time which is longer than the first exposure time.

7. A non-transitory computer-readable medium storing an imaging control program which actuates an imaging control apparatus to function as:
 an information obtainer which obtains information about a position of a vehicle; and
 an exposure time adjuster which, when the information indicates that the vehicle is on a road other than an expressway, adjusts an exposure time of a camera mounted in the vehicle to a first exposure time used when a first object is detected as being lit on an image captured by the camera, the first exposure time being selected to be shorter than a second exposure time used when a second object which is lower in illuminance than the first object is detected as being lit on the image, when the vehicle is on an expressway, the exposure time adjuster sets the exposure time of the camera to the second exposure time which is longer than the first exposure time.

* * * * *